July 6, 1926. 1,591,401
W. PALMER
METHOD OF AND APPARATUS FOR EXTINGUISHING FIRES
Filed April 15, 1925
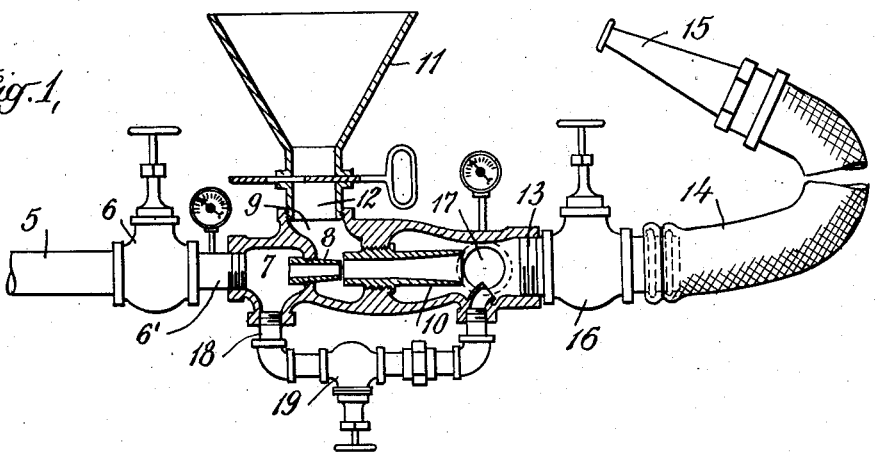
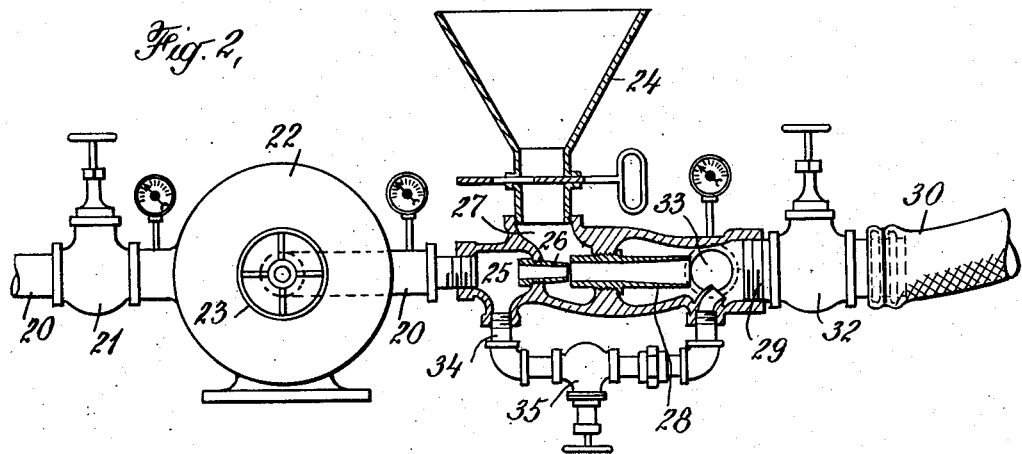
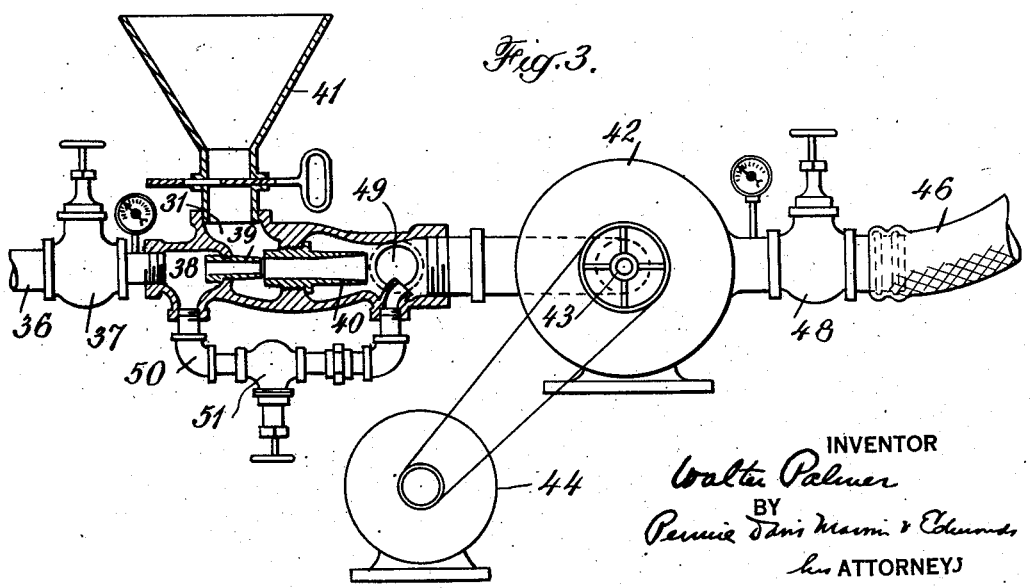
INVENTOR
Walter Palmer
BY
Pennie Davis Marvin & Edmonds
his ATTORNEYS Patented July 6, 1926.

1,591,401

UNITED STATES PATENT OFFICE.

WALTER PALMER, OF CHESTER, PENNSYLVANIA, ASSIGNOR TO AMDYCO CORPORATION, OF NEW YORK, N. Y., A CORPORATION OF NEW YORK.

METHOD OF AND APPARATUS FOR EXTINGUISHING FIRES.

Application filed April 15, 1925. Serial No. 23,266.

This invention relates to fire protection, and particularly to a method of and apparatus for producing fire-extingushing foam.

Foam for fire-extingushing use has been produced heretofore by combining solutions containing the necessary ingredients to generate a gas such as carbon dioxide which is entrained in a mass of bubbles. The ordinary ingredients are sodium bicarbonate and aluminum sulphate. These materials are dissolved in separate solutions and the foam stabilizer is added to one of them. The stabilizer may be an extract of licorice root or of oak bark or other material having the property of increasing the surface tension of the bubbles so that the foam will have lasting qualities. The production of foam in this way, except in the case of small hand-extinguishers, requires the installation and maintenance of comparatively large and expensive tanks and frequent inspection of the solutions to ensure that the foam-forming system is in satisfactory condition. Furthermore, the amount of foam that can be produced depends upon the quantities of the respective solutions which are stored. When one of the solutions is exhausted the production of foam ceases necessarily.

It is the object of the present invention to avoid the necessity of maintaining chemical solutions in tanks and to provide a method of and apparatus for producing foam efficiently and in a substantially continuous manner by combining a dry composition with a stream of water.

Other objects and advantages of the invention will be apparent as it is better understood by reference to the following specification and accompanying drawing, in which—

Fig. 1 is a side elevation, partially in section of an apparatus adapted for use in carrying out the method.

Fig. 2 is a similar view of a slightly different apparatus; and

Fig. 3 similarly illustrates another form of the apparatus.

In carrying out the invention the essential ingredients of a foam-forming composition are embodied in a dry mixture or composition. The composition may consist of sodium bicarbonate and aluminum sulphate or other materials adapted to generate gas in the presence of water and a stabilizier such as a dry pulverulent extract of licorice root or oak bark or other material which is capable of increasing the surface tension of the bubbles. Such a composition is stable and can be stored safely so long as it is dry. When it is combined with water in the proper proportions it forms a tough foam which can be spread as a blanket over a burning surface. The foam blanket excludes oxygen of the atmosphere from the surface and quickly extinguishes the fire.

The present invention involves the regulated addition of a dry composition to a flowing stream of water so as to produce the foam and to eject it continuously. The dry composition does not mix readily with water. I have discovered, however, that it can be incorporated in and mingled with a flowing stream of water by subjecting it to suction at the point of introduction. Apparently the suction has the effect not only of causing the dry powdered material to flow and consequently to be fed continuously to the stream, but also of reducing temporarily the pressure of the water which might otherwise tend to cause it to flow into the inlet through which the powder is admitted. By thus avoiding contact of the powdered composition with the water except as the composition is actually incorporated with the flowing stream, it is possible to maintain a continuous flow of foam of uniform consistency and evolved from predetermined proportions of water and powder. Furthermore, the proportions of powder and water and consequently the consistency of the foam can be varied by changing the degree of suction which is applied to the powder. This can be accomplished in various ways and furnishes the necessary control of the foam to ensure its application in proper condition for the accomplishment of the intended object. The consistency of the foam can be varied also by the addition of water thereto after the powder has been incorporated in the stream.

It is possible to apply suction to the powder by employing an injector through which the stream of water under suitable pressure is caused to flow. The water can be obtained from any usual source such as a hydrant or stand-pipe and is often available at pressures which will permit production of foam in a satisfactory way. In such an apparatus the powder may be supplied from a suitable hopper which is connected through an inlet to the suction chamber of the injector. The hopper may be provided with an agitator to ensure uniform flow of the powder. In the injector the pressure of the water is reduced to substantially atmospheric pressure and at the same time a partial vacuum is created in the suction chamber and is relieved by the flow of powder into the stream of water. The injector acts also as a mixer, causing the powder to be incorporated thoroughly with the water so that maximum efficiency of the reaction is assured. A stream of foam which results from the chemical reaction can be conveyed through an ordinary hose to the desired point of application. The pressure developed by the expansion of the gas bubbles in the foam is sufficient to direct a stream thereof for an effective distance of from seventy to eighty feet or to lift a column of foam to a height of forty feet or more. The foam is applied by causing it to flow over the burning surface.

A more effective apparatus, particularly where available water pressure is low, includes a pump as an auxiliary to the injector. A centrifugal or positive rotary pump can be used. In one form of the invention the pump is applied to boost the pressure of the water before it enters the injector and thus to increase the amount of available vacuum. In the other case the pump is applied on the opposite side of the injector so that the suction effect of the pump is added to that created by the injector as the result of the flow of water under pressure therethrough. The inclusion of the pump avoids the possibility of back pressure at the point where the powder is introduced. In either case the result is substantially the same as the suction applied to the powder causes it to enter and mingle with the flowing stream while the pressure of the water is reduced at the point where the powder enters the stream. By varying the effective suction exerted upon the powder by the injector or pump or both, the proportions of powder and water can be modified to permit the production of wet or dry foam with all of the intervening degrees of consistency which may be particularly adapted in special applications of the foam to accomplish the purpose thereof.

Referring to Fig. 1 of the drawing, 5 indicates a pipe leading from a source of water under pressure of, for example, one hundred pounds per square inch. A pressure-reducing valve 6 is disposed in the pipe to permit control of the stream. An injector 7 is connected to the pipe 6 and is provided with a nozzle 8, a suction chamber 9 and a nozzle 10. A hopper 11 which is adapted to contain the powder communicates through an opening 12 with the suction chamber. An outlet pipe 13 communicates with a hose 14 having a nozzle 15. The hose may be from fifty to one hundred feet or more in length so that the nozzle 15 may be carried to the point of application of the foam. A valve 16 may be placed in the outlet pipe 13 so that water may be forced into the hopper 11 to clear it of accumulations. A test cock 17 is also provided preferably to permit inspection of the foam before it is turned into the hose. A by-pass 18 with a valve 19 can be utilized to add water to the foam stream. When water is permitted to flow under the pressure indicated through the nozzle 8 a partial vacuum is induced in the suction chamber 9 at the same time that the pressure of the water is materially reduced. If the hopper is filled or partially filled with the dry mixture of foam-forming ingredients and the inlet 12 is open, the powder will be drawn into the stream and mingled therewith to produce foam efficiently and continuously. The foam can be directed as desired by manipulation of the nozzle 15. The degree of suction is controlled by the valve 6 to vary the consistency of the foam, or water may be supplied to the stream of foam through the by-pass 18.

In Fig. 2 of the drawing substantially the same structure is employed with the addition of a pump in this case to boost the pressure of the water flowing to the nozzle of the injector. A pipe 20 may be connected to a source of water which may or may not be under pressure, a valve 21 being disposed in the pipe to control the flow of water therethrough. A pump 22 of the centrifugal or positive rotary type is driven through a shaft 23 from a motor or other source of power. A gas engine or electric motor can be used with any well known device for controlling the engine or motor speed. The outlet 20 of the pump is connected to an injector 25 having a nozzle 26, a suction chamber 27 and a nozzle 28. A hopper 24 which is adapted to contain a supply of the dry foam-forming composition communicates with the suction chamber. An outlet 29 is connected to the injector and comunicates with a hose 30 having a nozzle to direct the foam as desired. A valve 32, test cock 33 and by-pass 34 with a valve 35 are provided as in the preceding embodiment of the invention. When water and the dry foam-forming composition are supplied and when the pump 22 is in operation, the water is forced through the injector, creates the necessary suction and draws in the required supply of the composition which is mingled with the water and forms the foam which is ejected through the nozzle. By varying the speed of the pump the degree of suction developed by the injector can be modified to change the consistency of the foam by varying the proportion of the dry material which is delivered to the stream of water.

In Fig. 3 the suction side of the pump is applied to the outlet from the injector. A pipe 36 with a controlling valve 37 is connected to a source of water under pressure and to an injector 38 having a nozzle 39, a suction chamber 31, and a nozzle 40. A hopper 41, adapted to contain a supply of the dry composition, communicates with the suction chamber. A pump 42 of the centrifugal or positive rotary type is driven through a shaft 43 from a gas engine or electric motor 44, with means for regulating the speed thereof so that the degree of suction exerted by the pump can be varied. The pump is connected to a hose 46 having a nozzle through which the foam is delivered. A valve 48, test cock 49 and by-pass 50 with a valve 51 are also provided. The suction created by the pump and/or by the injector causes the powdered foam-forming material to flow continuously into the suction chamber and there to mingle with the flowing stream. The mixing of the powder with the water is facilitated by the action of the pump so that a uniform foam can be produced continuously and delivered as required.

Each of the forms of the apparatus as illustrated and described herein depends upon the principle of subjecting the dry composition containing foam-forming and stabilizing ingredients to suction concurrently with the introduction thereof to the stream of water. The application of suction to the powdered material prevents the clogging of the inlet, ensures a uniform flow and permits the regulation of the proportion of powder so as to produce a stream of foam having the desired consistency. It avoids all defects inherent in the mechanical introduction of powdered material with mechanical devices or the use of an air blast with the resulting introduction of oxygen to the foam.

Various changes may be made in the details of construction of the apparatus and in the size and method of operation thereof without departing from the invention or sacrificing any of the advantages thereof.

I claim:—

1. A method of producing foam for fire-extinguishing purposes, which comprises subjecting a dry composition containing foam-forming and stabilizing ingredients to suction concurrently with the introduction thereof to a stream of water producing said suction, mingling the composition with the water and ejecting the foam produced.

2. A method of producing foam for fire-extinguishing purposes, which comprises subjecting a dry composition containing foam-forming and stabilizing ingredients to suction concurrently with the introduction thereof to a stream of water producing said suction, mingling the composition with the water, ejecting the foam produced and regulating the consistency of the foam by varying the suction to which the dry composition is subjected.

3. A method of producing foam for fire-extinguishing purposes, which comprises adding a dry composition containing foam-forming and stabilizing ingredients to a flowing stream of water by suction induced by the flowing stream mingling the composition with the water and ejecting the foam produced.

4. A method of producing foam for fire-extinguishing purposes, which comprises subjecting a dry composition containing foam-forming and stabilizing ingredients to suction concurrently with the introduction thereof to a stream of water producing said suction, mingling the dry composition with the water, adding water to the foam stream thus formed and ejecting the foam stream.

5. In an apparatus for producing foam for fire-extinguishing purposes, a hopper adapted to contain a dry composition including foam-forming and stabilizing ingredients, means for conveying a stream of water, an inlet from the hopper to the conveying means, means for maintaining suction at the inlet, including an injector in the path of the stream of water and a by-pass around the injector.

In testimony whereof I affix my signature.

WALTER PALMER.